(12) United States Patent
Amano (10) Patent No.: US 6,983,056 B1
(45) Date of Patent: Jan. 3, 2006

(54) METHOD AND DEVICE FOR EMBEDDING AND DETECTING WATERMARKING INFORMATION INTO A BLACK AND WHITE BINARY DOCUMENT IMAGE

(75) Inventor: Tomio Amano, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 09/621,567

(22) Filed: Jul. 21, 2000

(30) Foreign Application Priority Data

Aug. 6, 1999 (JP) ................................ 11-223490

(51) Int. Cl.
*G06K 9/00* (2006.01)
(52) U.S. Cl. ...................................................... 382/100
(58) Field of Classification Search ................ 382/100, 382/176, 232; 380/243, 246, 51; 713/176; 283/72, 73, 74; 399/366; 700/57, 58; 358/3.28
See application file for complete search history.

(56) References Cited

U.S. PATENT DOCUMENTS

| | | | |
|---|---|---|---|
| 5,530,759 A | | 6/1996 | Braudaway et al. |
| 5,761,686 A | * | 6/1998 | Bloomberg .................. 715/529 |
| 5,825,892 A | | 10/1998 | Braudaway et al. |
| 6,086,706 A | * | 7/2000 | Brassil et al. ................ 156/277 |
| 6,327,385 B1 | * | 12/2001 | Kamitani ..................... 382/177 |
| 6,456,393 B1 | * | 9/2002 | Bhattacharjya et al. ....... 358/1.9 |
| 6,473,523 B1 | * | 10/2002 | Newman et al. ............. 382/176 |
| 6,580,804 B1 | * | 6/2003 | Abe ............................ 382/100 |
| 6,753,977 B2 | * | 6/2004 | Hoover ........................ 358/1.9 |
| 6,782,509 B1 | * | 8/2004 | Hirayama et al. ........... 715/531 |

FOREIGN PATENT DOCUMENTS

| | | |
|---|---|---|
| JP | 6-324625 | 11/1994 |
| JP | 7-84485 | 3/1995 |
| JP | 7-222000 | 8/1995 |

OTHER PUBLICATIONS

"Copyright Protection for the Electronic Distribution of Text Documents", by J. T. Brassil, et al., pp. 1-22.
"Electronic Marking and Identification Techniques to Discourage Document Copying", by Jack T. Brassil, et al., IEEE Journal on Selected Areas in Communications, vol. 13, No. 8, Oct. 1995, pp. 1495-1504.
"A method for embedding digital watermark in page descriptions", by Tomio Amano, et al., IBM Japan, Ltd., Tokyo Research Laboratory, pp. 45-50.

* cited by examiner

*Primary Examiner*—Andrew W. Johns
*Assistant Examiner*—Shervin Nakhjavan
(74) *Attorney, Agent, or Firm*—Scully, Scott, Murphy & Presser; Louis P. Herzberg (57) ABSTRACT

As a document image on paper is usually black and white binary data, an embedding method for colored and multi-valued data using a variation of light and dark could not be applied. When a document printed on paper was captured by a scanner or the like, it was difficult, since it had changed at a pixel level, to stably detect embedded additional watermarking information. A text area is detected from a document image, and the features of the detected text area are increased or decreased, or the detected text area is split into two or more subblocks, and the subblocks are divided into two or more groups, of which features are increased or decreased respectively so as to embed additional watermarking information. When detecting a watermark, additional watermarking information is detected by comparing the integrated values of the features acquired from the respective groups.

12 Claims, 11 Drawing Sheets

FIG. 1

FIG. 2A
EMBEDDING PROCESS FLOW

FIG. 2B
DETECTING PROCESS FLOW

FIG. 3A
TEXT LINE RECTANGLE

FIG. 3B
EXAMPLE OF SPLITTING INTO SUBBLOCKS

FIG. 3C
EXAMPLE OF GROUPING ((1) AND (2) REPRESENT THE GROUPS THEY BELONG TO)

FIG. 4

FIG. 5A
AN IMAGE WITH NO EMBEDDING

IT HAS BECOME POSSIBLE, DUE TO DIFFUSION OF THE INTERNET AND CD-ROM, TO EASILY DISTRIBUTE AND CIRCULATE DIGITAL CONTENTS. WHILE THIS PROMPTS DEVELOPMENT OF NEW APPLICATION/BUSINESS SUCH AS INFORMATION DELIVERY SERVICES UTILIZING THE INTERNET, WRONGFUL DUPLICATION OR TAMPERING OF THE CONTENTS TAKE PLACE

FIG. 5B
AN IMAGE WITH 1 EMBEDDED IN EACH LINE

IT HAS BECOME POSSIBLE, DUE TO DIFFUSION OF THE INTERNET AND CD-ROM, TO EASILY DISTRIBUTE AND CIRCULATE DIGITAL CONTENTS. WHILE THIS PROMPTS DEVELOPMENT OF NEW APPLICATION/BUSINESS SUCH AS INFORMATION DELIVERY SERVICES UTILIZING THE INTERNET, WRONGFUL DUPLICATION OR TAMPERING OF THE CONTENTS TAKE PLACE

FIG. 5C
AN IMAGE WITH 0 EMBEDDED IN EACH LINE

IT HAS BECOME POSSIBLE, DUE TO DIFFUSION OF THE INTERNET AND CD-ROM, TO EASILY DISTRIBUTE AND CIRCULATE DIGITAL CONTENTS. WHILE THIS PROMPTS DEVELOPMENT OF NEW APPLICATION/BUSINESS SUCH AS INFORMATION DELIVERY SERVICE UTILIZING THE INTERNET, WRONGFUL DUPLICATION OR TAMPERING OF THE CONTENTS TAKE PLACE

METHOD AND DEVICE FOR EMBEDDING AND DETECTING WATERMARKING INFORMATION INTO A BLACK AND WHITE BINARY DOCUMENT IMAGE

BACKGROUND OF THE INVENTION

1. Technical Field

The present invention relates to a method and a device for embedding and detecting additional watermarking information in a black and white binary document image, said method and device embedding such information in the form not immediately recognizable to human eyes so as to facilitate prevention of cheating or protection of various rights.

2. Prior Art

Along with the globalization of business activities and the increasing awareness of consumers' rights, increasingly strict control has been required as to information handled by companies and public institutions. It can be considered as a consequence of the established consensus that wrongful spilling, forgery or tampering of information are disadvantageous to society in many ways in the forms of obstruction to fair competition or invasion of privacy and the like. Although information is mostly managed by a computer nowadays, spilling and leakage of information are often conducted using paper. While paperless work is advocated consumption of paper in offices is recently increasing in the form of printout from computers. Furthermore, diffusion of the office appliances such as copiers and faxes brought about a situation in which spilling of information can easily occur. Under such circumstances, a technical means to prevent paper-based spilling and leakage of information and to trace any spilled and leaked document is required.

Moreover, while diffusion of the DTP (desk top publishing) software and printers has facilitated creation of high-quality print documents, it has also increased the risk that a document which is seemingly true other than the different contents from the original may be created, namely forged and abused. To indicate that a document is not forged, a special form or ink, such as a form with a physical watermark can be used, but it leads to higher running costs. However, general documents are those printed and copied using ordinary forms and ink, and a method whereby information ensuring their authenticity can be attached to them is required.

For instance, Japanese Unexamined Patent Publication No. Hei7-84485, abandoned without request for examination, discloses a technique for embedding a watermark to identify an output device of a copier, and this technique implements embedding by changing brightness of the yellow toner in two or more areas placed on the entire page. As a matter of course, scanning of a colored and multivalued image is required to detect it, but documents are generally not multivalued but black and white binary, and it is not practical cost-wise to go to the extent of adding a function for capturing a color image to a black and white copier or a fax in order to detect a watermark.

Japanese Unexamined Patent Publication No. Hei6-324625, abandoned without request for examination, discloses a technique for embedding a watermark by means of subtle differences in shape such as a touch of a character. However, an image scanned after printing on paper has changed from the original image at a pixel level since it is influenced by the type of a printer's printing mechanism and the difference in resolution between a printer and a scanner. In addition, there are also changes due to establishment of density and how the document is written such as misregistration or skew (slant of paper) on copying, printing and scanning, and an effect of noise such as stains and blurs. It is difficult to stably detect, among these changes, a local change in shape due to embedding.

Japanese Unexamined Patent Publication No. Hei7-222000, now Japanese Patent 3,136,061, discloses a technique for embedding a watermark by increasing and decreasing vertical intervals of a center line in text lines. This technique can endure the scan after printing, but it cannot be applied to the above-mentioned scenario for preventing spilling and leakage since it requires the information extracted from the original document on detection.

An object of the present invention is to solve the above-mentioned problem and provide a method and a device for embedding additional watermarking information even into the data that is usually a black and white binary document image on paper and stably detecting the embedded information.

SUMMARY OF THE INVENTION

First, an area of text lines is detected from a document image, and features in the area are changed so as to embed and detect a watermark by observing them change. It is possible, by making the text lines (usually, a circumscribed rectangle) detected from the image itself a criterion, to implement watermarks that are robust against misregistration or skew, and by utilizing a difference and a ratio of one or a combination of features, those which are also robust against overall noise such as stains and blurs.

In embedding a watermark, a subject image area (text lines) is split into two or more subblocks and the subblocks are divided into two or more groups. The subblocks belonging to one group are modified to increase the features and the subblocks belonging to the other group are modified to decrease them. On detection of the watermark, the features extracted from the subblocks are summed up group by group, and it is determined by comparing the values acquired from two groups whether a watermark is embedded and if so, whether the watermark's bit is 1 or 0. It is possible, by accumulating local change of features, to render resistant to the random changes of features (stains, blurs, etc.) made on copying, printing and scanning, a document with a lot of noise and a document of low printing quality.

Moreover, it becomes possible, by expressing information of the values acquired from the two groups using a difference and a ratio between the values, to stably detect a watermark against the noise that increases or decreases features on the entire page. While it is explained about two groups of subblocks for convenience sake here, there may be more than two groups, for instance. Also, as for increase or decrease of the features, it is possible to increase or decrease the features in steps so as to embed more additional watermarking information, not limited to the two-step operation of increase and decrease. However, there is a problem that, the more additional watermarking information is embedded in the same area, the lower the likelihood (stability) of detecting the information embedded into the document image becomes. Nevertheless, this problem can be handled since the likelihood can be enhanced by enlarging the area for embedding per-bit watermarking information, namely by accumulating the features of a few text lines per bit.

While it has been explained according to the method as above, the object, effects, etc. of the present invention can be achieved even in the form of a device for embedding and detecting additional watermarking information that includes a means of detecting a text area in an image and a means of modifying and detecting the features in the detected text area.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

For instance, prevention of leakage and tracing of confidential information are implemented as follows by using electronic watermarking.

When printing a document, information about security is embedded into the image data to be printed by using electronic watermarking technology.

When scanning a paper document by a copier or a fax, it is checked whether a watermark is embedded in the image data, and measures are taken such as prohibition of copying or faxing, or recording (in the case of a fax, keeping an outgoing record of who sent where, etc.) according to the detected security.

When using electronic watermarking for preventing forgery of documents or authenticating them, their authenticity is verified by embedding a watermark on printing and seeing whether the same watermark can be detected from the presented documents.

However, to implement the above scenario by using electronic watermarking, the following points are considered.

As a document image is often expressed as black and white binary data, an embedding method using a variation of light and dark cannot be applied.

It must be robust against misregistration or skew (slant of paper) and noise such as stains and blurs on printing, copying or scanning.

An image of a scanned printed matter must not be identical with the original image if seen at a pixel level.

Figure 1:
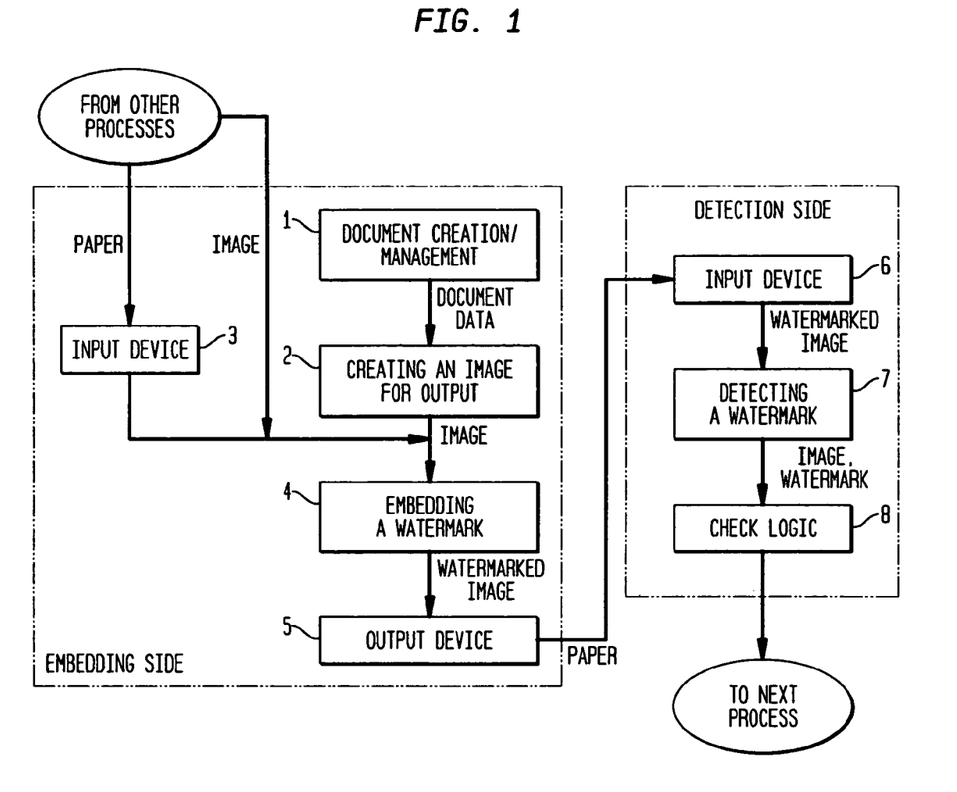
FIG. 1 is a diagram showing a structure of a document image application using a watermark.

FIG. 1 shows an example of a structure of an application using embedding and detection of a watermark into a document image. "Document creation/management" of 1 in the embedding side module is a system for electronically creating, storing and communicating a document, which is equivalent to the existing word processor, groupware and document database, etc. In outputting coded document data onto a medium such as paper, image data (or equivalent data representation) is generated for each page by "Creating an image for output" of 2, and "Embedding a watermark" of 4 embeds a watermark. As for an image, it is also possible to have a structure as in FIG. 1 wherein it is input from other processes or the "Input device" of 3 to the "Embedding a watermark" module of 4. If a paper document is sent from other processes, the image data is captured by the "Input device" (such as an image scanner) of 3, and it is input to the "Embedding a watermark" module of 4. The image in which a watermark is embedded is output as a paper document by an adequate a "Output device" (such as a printer) of 5.

While an output paper document is physically stored and communicated thereafter, there is a possibility that it may be wrongfully taken out, or tampered or forged in the process. In the detection side module, it is checked whether an authentic watermark is embedded, and if determined as inauthentic, it is controlled so that any process (such as copying or sending a fax) thereafter is not performed. First, it is captured as an image by the "Input device" (such as an image scanner) of 6. The image is processed by the "Detecting a watermark" module of 7, and then the result is delivered to the "Check logic" of 8 so as to determine there whether or not the requested process (such as copying or sending a fax) may be performed. In FIG. 1, it is possible to have a structure wherein the modules of "Creating an image for output" of 2 and "Embedding a watermark" of 4 are incorporated as firmware into the "Output device" of 5. Likewise, it is also possible to have a structure wherein "Detecting a watermark" of 7 and the "Check logic" of 8 are incorporated as firmware (a kind of a program stored in a device necessary for operating the device) into the "Input device" of 6. It is also possible, by omitting the "Output device" of 5 and the "Input device" of 6, to compose an application software for checking forgery, tampering and wrongful sending of electronic image data.

Figure 2A:
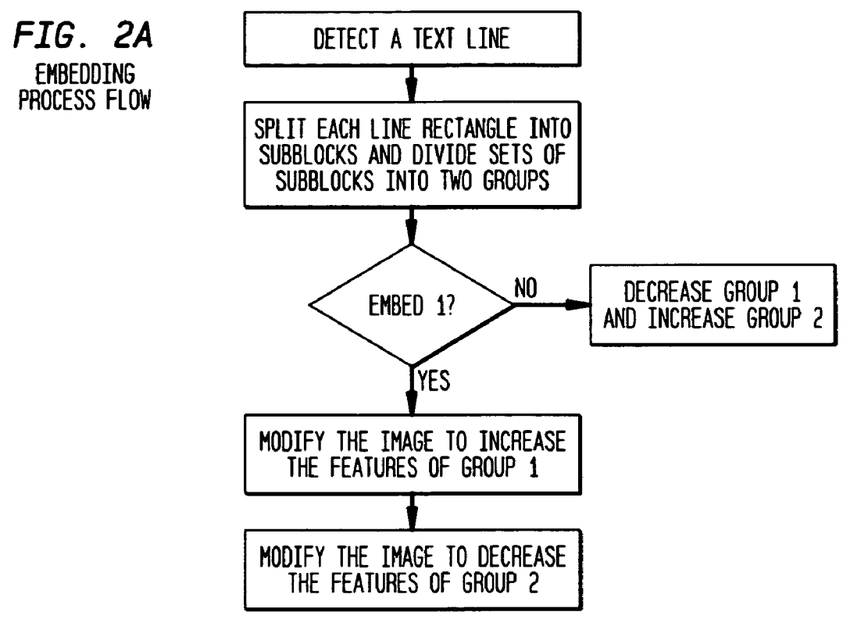
FIG. 2 is a diagram showing a flowchart of embedding/detecting additional watermarking information in a document image.

In the above-mentioned structure, the modules of "Embedding a watermark" of 4 and "Detecting a watermark" of 7 are the core of the present invention. FIG. 2 is a flowchart of embedding and detecting a watermark by this technique. The input of the embedding process is a page image of the original document, and the output is a page image with a watermark embedded. As for a detecting process, an image (usually, one scanned after printing) is input, and a bit string indicating that no watermark is embedded or watermark information is output. For convenience of explanation, a case of embedding and detecting 1 bit is explained here. It is of course possible to embed two or more bits without deviating from the intent of the present invention.

As a first step of an embedding process, a text area in an image is detected, and coordinates of a rectangle circumscribed around each text line are calculated. This is a background art, and the existing layout analysis technique developed in the fields of OCR or document image analysis can be used.

As for the detected set of rectangles circumscribed around the lines, each rectangle is split into subblocks, and the subblocks are divided into two groups. Splitting and grouping can be randomly determined, as far as the same ones are used in embedding and detecting a watermark. However, the following are desirable to enhance likelihood of detecting watermarks, namely to stably detect a watermark.

1) There is no significant difference in the total sums of the area of the blocks belonging to each group.
2) If a line rectangle is split into upper and lower portions, the upper and lower subblocks belong to separate groups respectively.
3) This has an effect of setting off a element that changes the features used in embedding, such as influence in a case where the Gothic type is partially used in text of the Mincho typeface.

Figure 3A:
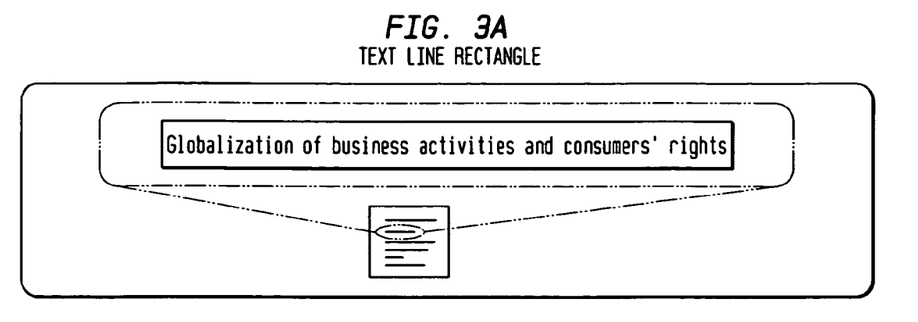
FIG. 3 is a diagram showing splitting into and grouping subblocks of a text line rectangle.
Figure 3B:
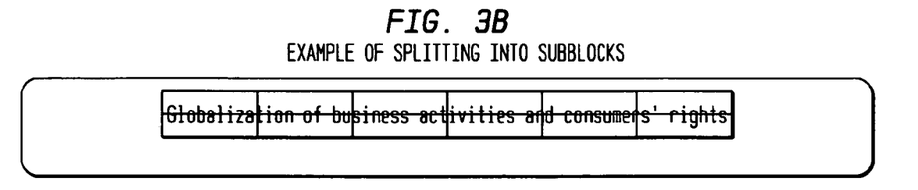
Figure 3C:
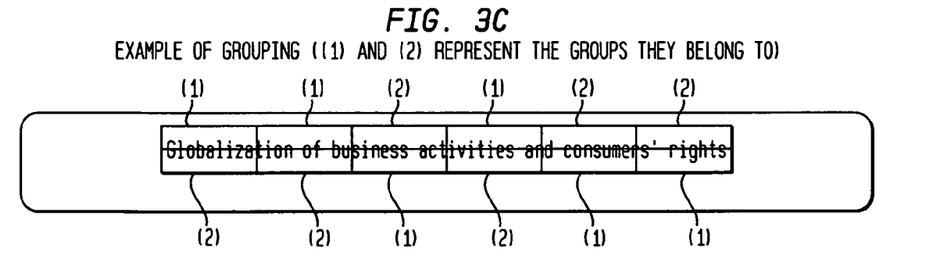

FIG. 3 shows an example of splitting and grouping of a line rectangle. In this example, a rectangle circumscribed around the text line of "Globalization of business activities and consumers' rights" is horizontally divided into six equal parts, and vertically divided into two equal parts so as to be totally divided into 12 subblocks. (1) and (2) of FIG. 3(c) indicate the groups that the subblocks belong to, namely they are grouped into two kinds of (1) and (2).

Depending on whether 1 is embedded or 0 is embedded as watermarking information, the features of images are increased or decreased for each groups. In this embodiment, when embedding 1, a subblock belonging to group (1) will have its features increased, and on the contrary, a subblock belonging to group (2) will have its features decreased. When embedding 0, an operation in reverse of this is performed. This rule can be established in reverse, if there is consistency between embedding and detecting of a watermark. The features referred to here means the scalar calculated from an image based on an appropriate rule. For instance, while the number of black pixels, the number of black and white transitions (the number of times a value of a pixel changes from white to black (or from black to white) when a raster scan is performed on a certain range of an image to observe a run of black and white pixels), occurrence frequency of a specific local pattern, average thickness of a line segment and so on are all features, the features that can be used for watermarking must be statistically constant to an extent in a state with no watermarking. This is because, if not statistically constant, the likelihood (stability) of detecting the watermarking information becomes low. This embodiment is characterized by the value that is the number of black pixels in a subblock normalized by the square of the ambient length of the black pixel area.

Figure 8:
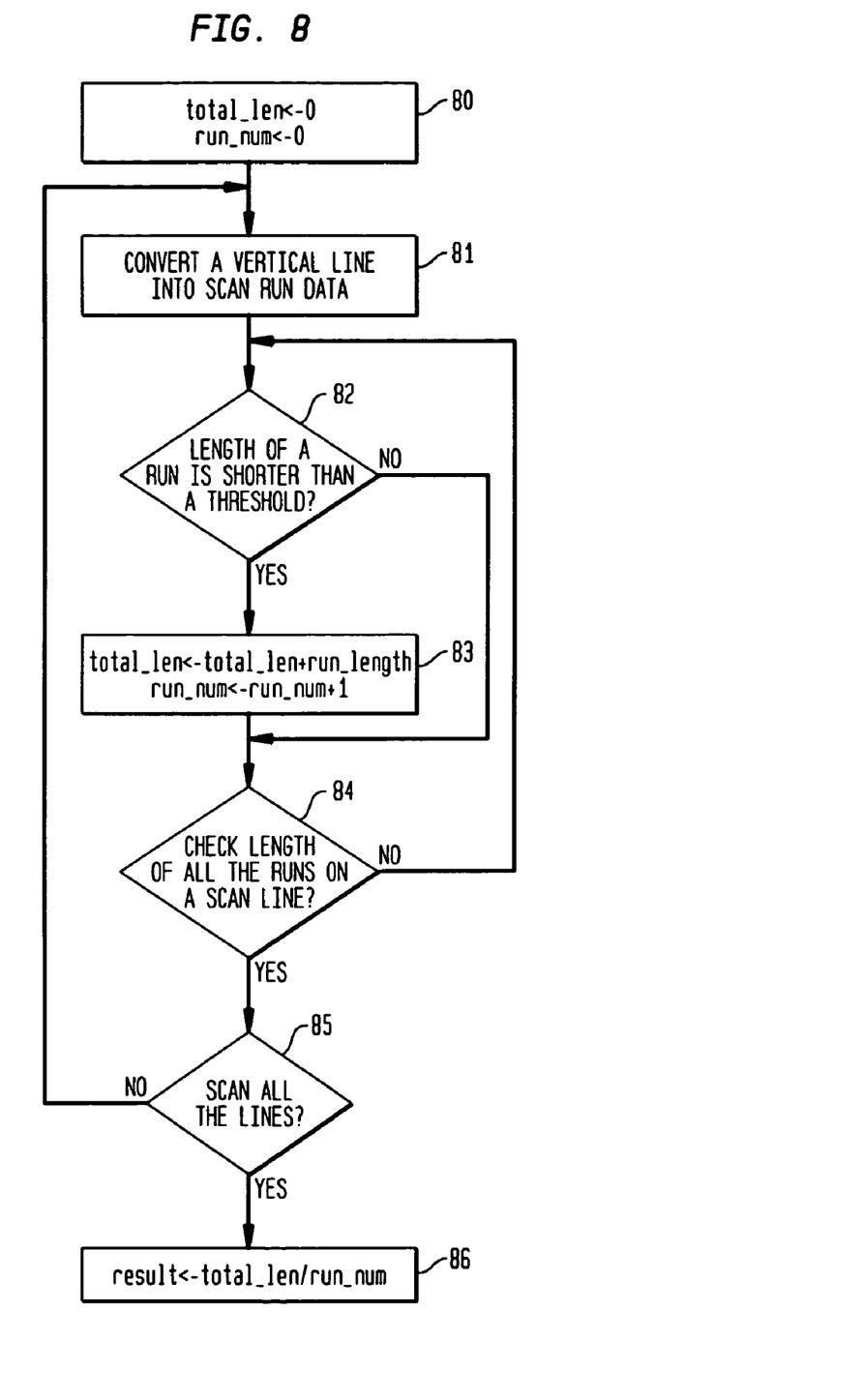
FIG. 8 is a diagram showing a flowchart of detecting the features (information of thickness of a line segment).
Figure 9:
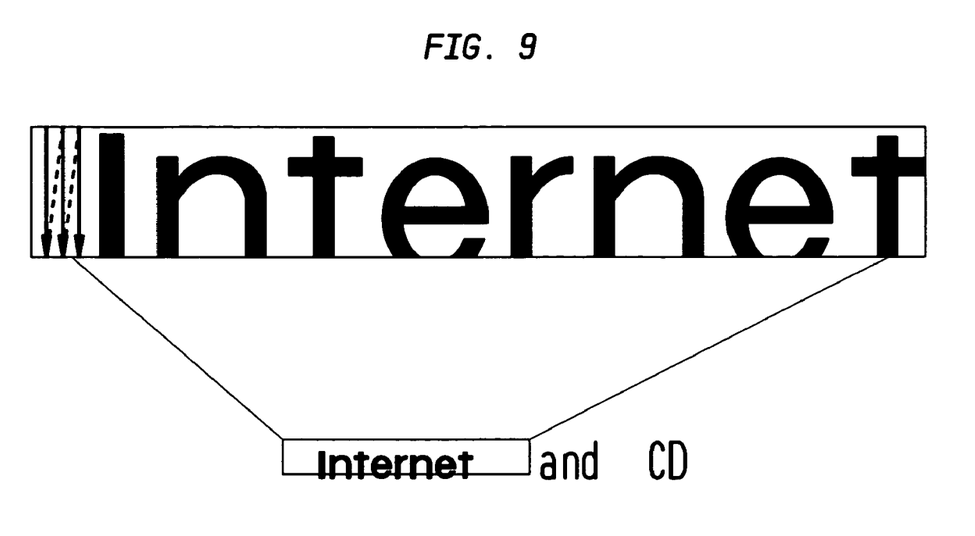
FIG. 9 is a diagram showing a raster operation of which primary operational direction is vertical in detecting the features (information of thickness of a line segment).

It is also possible, by way of another example, to utilize average thickness of a line segment as a feature. FIG. 8 shows a flowchart of detecting an average thickness of a line segment. As shown in FIG. 9, thickness is detected by performing a raster operation at 81 on a subject rectangular area of which primary operational direction is vertical. A program for detecting thickness information observes each vertical scan line and detects a run of black pixels, and then converts it into run data (information of a viewpoint and length) at 81. Length of each run is compared with a threshold of which length is predetermined at 82, and the length and number of the shorter run is recorded at 83. When the raster operation is complete at 86, an average run length is calculated. In the flowchart of FIG. 8, a horizontal line segment or a line segment close to horizontal are the subjects for detection. Length is compared with a threshold at 82 in order to consider as subjects for counting only the runs crossing from above a horizontal line segment or a line segment close to horizontal. FIG. 8 is a flowchart for detecting features such as the thickness of a line segment.

The operation starts at 80 with total len (length)<–0, and run num (number)<–0. A first vertical line is then converted into scan run data at 81, and at 82 the length of the run is checked to determine if it is shorter than a threshold. If Yes, at 83 increment total len<–total len and run length, and run num<–run num+1. If No, bypass 83, and at 84 determine if the length of all of the runs on the scan line have been checked. If No, return to 82 to check the length of the next run. If Yes, proceed to 85 to determine if all of the vertical lines have been scanned. If No, return to 81 to convert the next vertical line to scan run data. If Yes, determine at 86 the result<–total len/run num.

Figure 4:
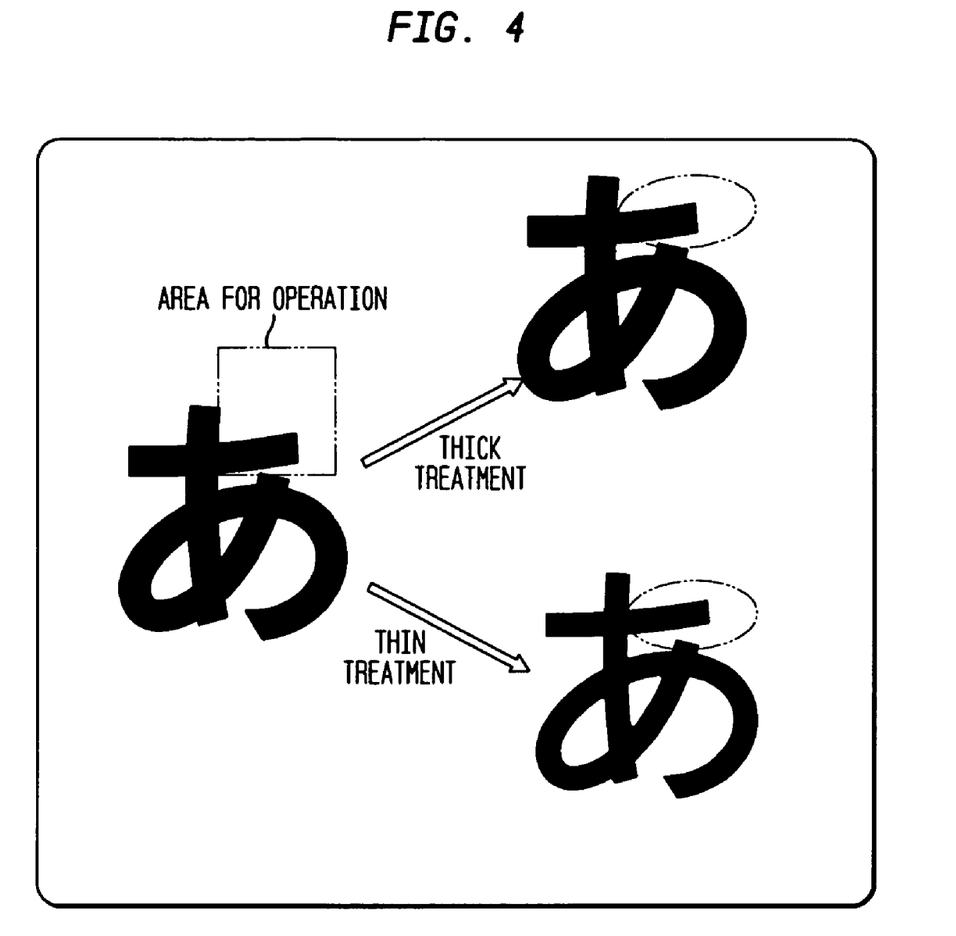
FIG. 4 is a diagram showing an example of an operation of the features (thickness of a line segment).

While the seeming "thickness" becomes large as to an oblique line segment, it is possible to use it as a feature of watermarking since it is statistically constant without any special correction in a state with no watermarking. It is also possible to use as a feature of watermarking, changing the primary scanning direction of the raster scan to horizontal, thickness of vertical and close to vertical line segments, and a combination of both horizontal and vertical line segments, or tracing the contour of the black pixel area, line segment thickness in the correct meaning (provided that the calculation amount increases), and local contour features (summed up in respective directions of vertical/horizontal/oblique when border lines were locally observed). In the case of this embodiment, a thick treatment (increase in features) and a thin treatment (decrease in features) as shown in FIG. 4 are used as an operation for changing the features.

Figure 5A:
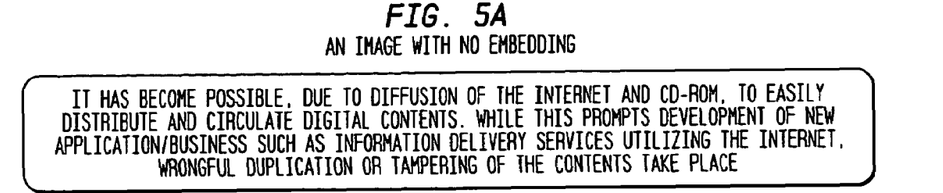
FIG. 5 is a diagram showing an example of an image scanned after embedding.
Figure 5B:
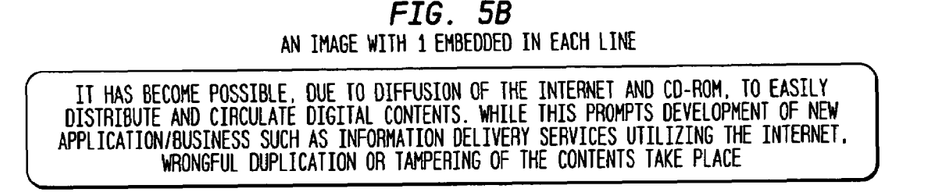
Figure 5C:
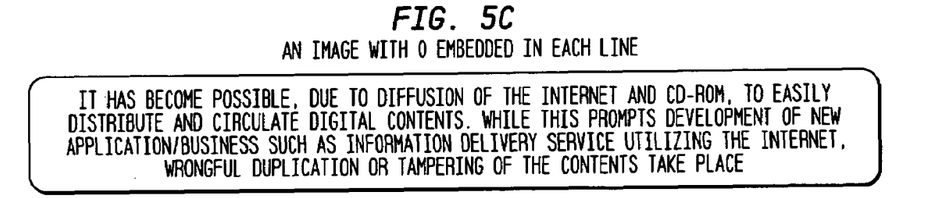

FIG. 5 shows a result of embedding a watermark in this embodiment. In this example, each line is vertically and horizontally divided into two halves, namely four subblocks, defining the upper left and lower right subblocks as group 1 and the lower right and upper left subblocks as group 2. The thick and thin treatments were performed on horizontal line segments comprising the character pixel by pixel. These treatments can also increase or decrease pixels as far as embedding of a watermark can be stably detected and verified in a difference or a ratio of the features. However, if a treatment that enlarges a difference or a ratio of the features is given, there will be a consequence not so desirable to the nature of a watermark since the likelihood (stability) of detecting and verifying a watermark becomes high, and oppositely the possibility of the watermark to be visually recognized by a user becomes high.

Figure 2B:
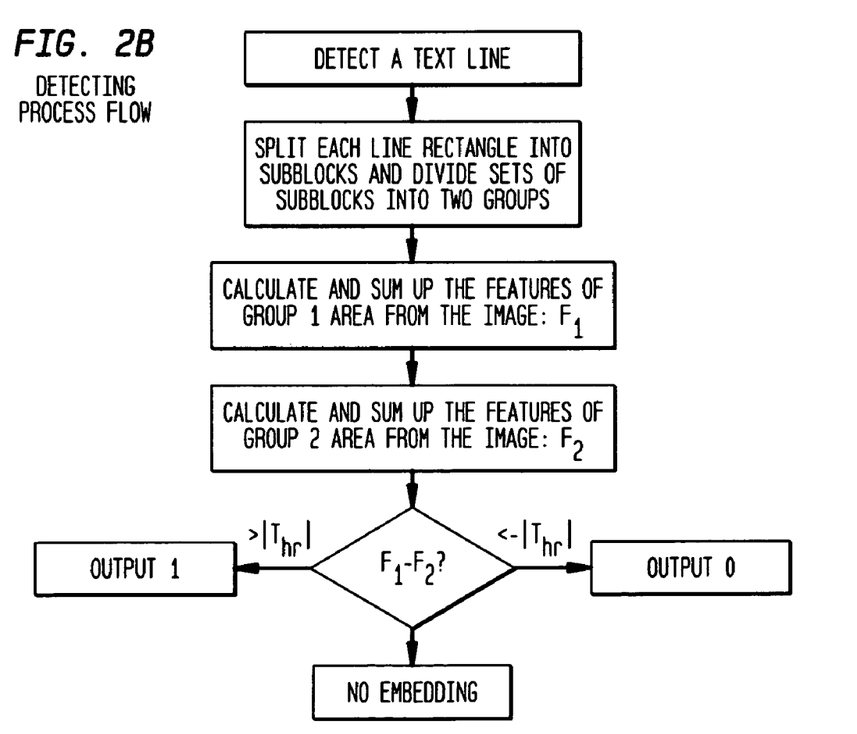

In the detecting process of a watermark (see FIG. 2(b)), after a text line rectangle is identified, divided into subblocks and grouped as in the embedding process, the features (the number of black pixels normalized by the square of the ambient length of the black pixel area) are extracted from each subblock so as to sum them up group by group. If the difference in the total sum (the value of $F_1-F_2$ in FIG. 2(b)) is larger than a positive threshold ($F_1-F_2>$|T|), 1 is output, and if it is smaller than a negative threshold ($F_1-F_2<-$|T|), 0 is output, and it is determined as no embedding in any case other than these. Or, it is also possible that 1 is output if the ratio of the total sum ($F_1/F_2$) is sufficiently larger than 1, and 0 is output if it is smaller than 1, and it is determined as no embedding in any case other than these.

Table 1 shows the results of calculating the value of $(F_1-F_2)\times 10^6$ for each line. These values were calculated after an image into which a watermark had been embedded and an image with no watermark were output on paper by a printer of 300-dpi resolution, captured by a 400-dpi scanner and then went through skew correction. In this example, even after printing and scanning, the images with 1/0 embedded show the values significantly fluctuating to positive and negative in contrast to the image with no embedding. However, as the values with no embedding also extend over the range of −613 to 91, there is not enough likelihood of embedding 1 bit in 1 line of data and stably detecting it. Nevertheless, as in Table 1, calculation of averages and standard deviations shows that, if 1 bit is represented in two or more lines, then stable (the probability of being determined as having a watermark in spite of no embedding is sufficiently low) detection is possible.

TABLE 1

Results of extracting features from a scanned image

|  | No embedding | Embedding 1 | Embedding 0 |
| --- | --- | --- | --- |
| Line 1 | −188 | 692 | −1216 |
| Line 2 | −613 | 346 | −1409 |
| Line 3 | −198 | 722 | −1057 |
| Line 4 | 100 | 1220 | −1228 |
| Line 5 | −117 | 892 | −1099 |
| Line 6 | −127 | 846 | −1273 |
| Line 7 | −300 | 716 | −1607 |
| Line 8 | 4 | 898 | −957 |
| Line 9 | 91 | 958 | −729 |
| Line 10 | −420 | 651 | −1275 |
| Average | −176.8 | 794.1 | −1185 |
| Standard | 224.2 | 229.6 | 242.8 |

Figure 10A:
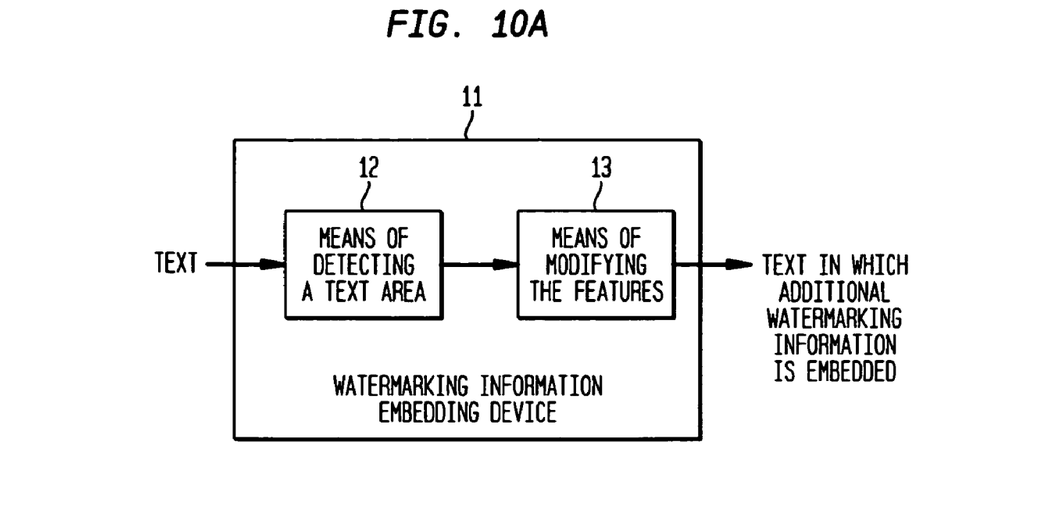
FIG. 10 is a block diagram showing device for embedding/detecting additional watermarking information in a document image.
Figure 10B:
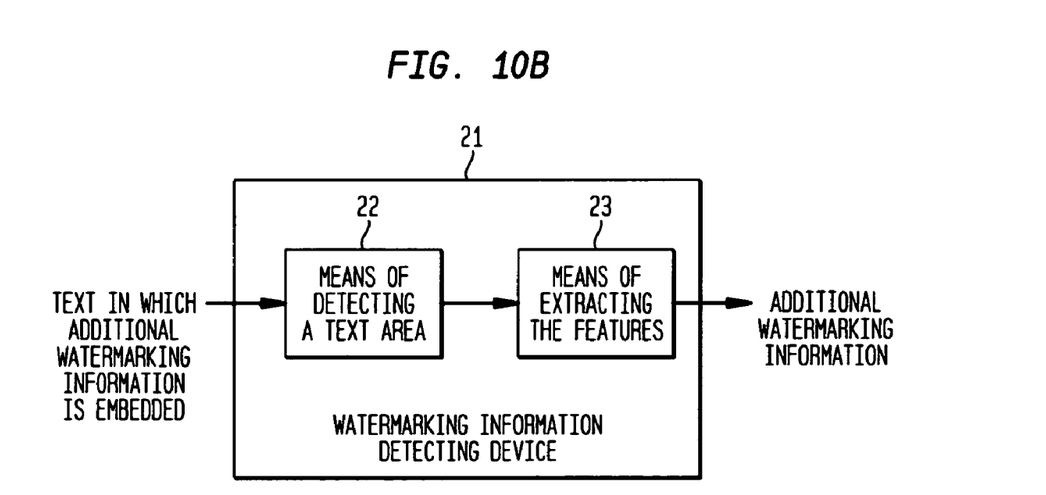
Figure 11A:
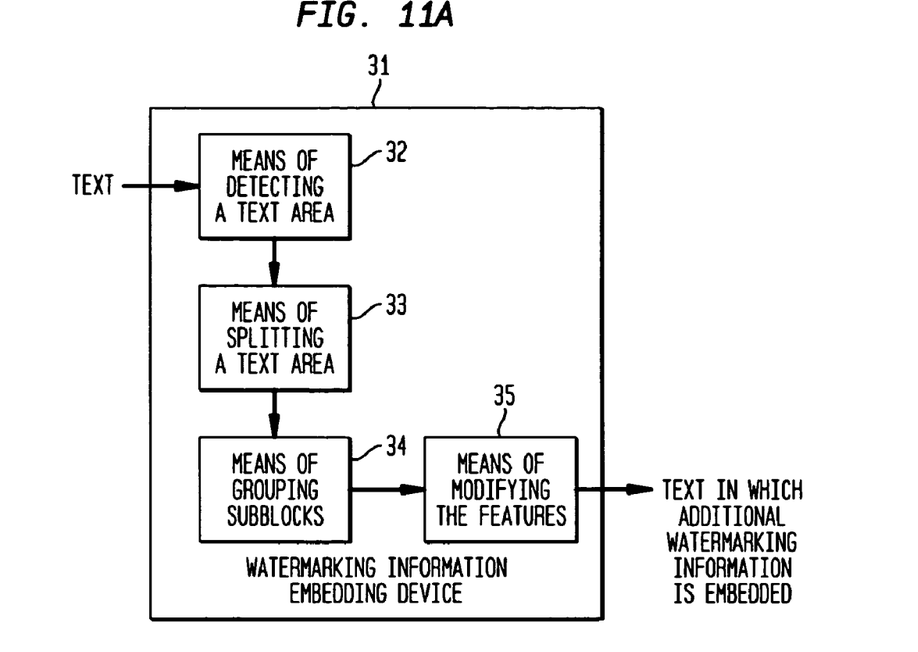
FIG. 11 is a block diagram showing device for embedding/detecting additional watermarking information in a document image.
Figure 11B:
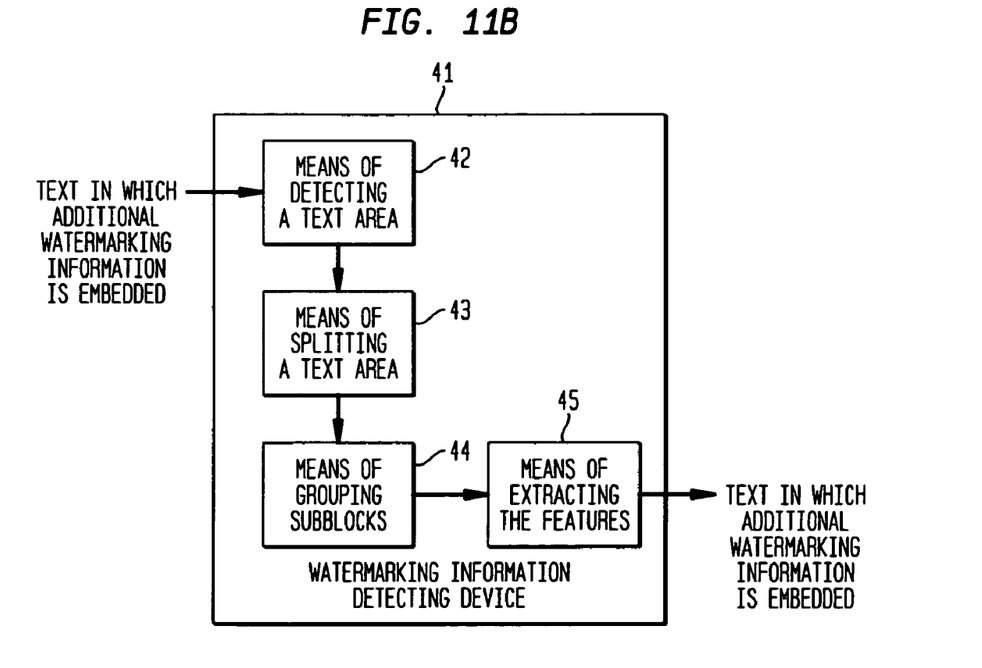

As in FIG. 10(a), (b), the present invention can also be implemented in the form of a device comprising the means (12, 22) to detect a text area in an image and means 13 to modify the features of a detected text area or means 23 to extract the features. Likewise, as in FIG. 11(a), (b), the present invention can also be implemented in the form of watermarking information embedding device 31 or watermarking information detecting device 41 comprising means (32, 42) to detect a text area in an image and means (33, 43) to split the detected image area into subblocks, and means (34, 44) to divide the subblocks into groups and means 35 to modify the features of the detected text area or means 45 to extract the features;

The following summarizes the above-mentioned merits of the present invention.
(1) The features in an area split into subblocks are accumulated (the features accumulated in each group, and accumulated in two or more lines) so that it is robust against the random changes of features (noise) made on printing and scanning, and thus a watermark can be stably embedded and detected even in a document of relatively low printing quality or a document with stains and blurs (noise).
(2) The features have only to be statistically constant in a state with no watermarking, so various features can be used, such as average thickness of a horizontal line segment, average thickness of a vertical line segment or a combination of these, and thus its versatility is very high.
(3) It is possible, by making the text lines (usually, a circumscribed rectangle) extracted from the image itself a criterion, to implement watermarks that are robust against misregistration or skew.
(4) If how to split into and group subblocks and which features to use are kept secret only to the issuer, a forger cannot embed the same watermark into a document even if he or she knows the algorithm of the watermark or has a printer with a watermark embedding function.
(5) It is possible, by splitting into and grouping subblocks, to set off the influence on the features and stably embed a watermark in the case that different typefaces are used.

Figure 6:
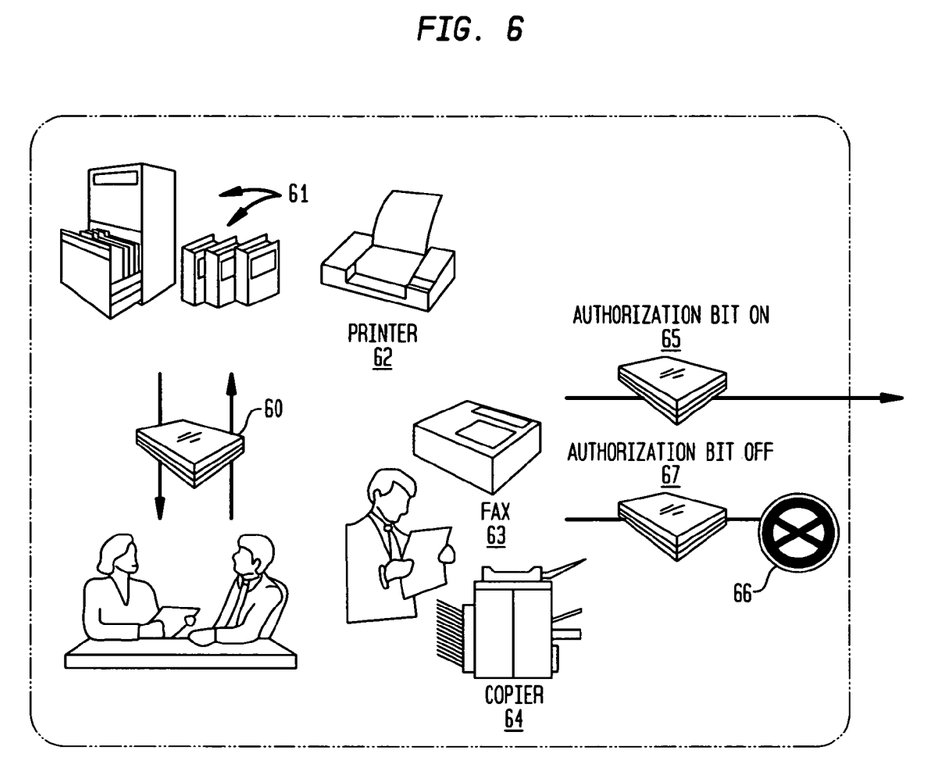
FIG. 6 is a diagram showing management of a confidential document by watermarking.

FIG. 6 shows, as an example of application of contents identification, a frame for managing confidentiality of document 60 (stored in files 61) information by using the present invention. A function of embedding a watermark is incorporated into the printer 62 in the diagram, and a function of detecting a watermark is incorporated into the fax 63 and copier 64. When printed by a printer, an authorization bit of faxing or a copying is embedded into a document as a watermark. When this document is about to be copied or faxed, watermarking information is checked in scanning, and the process is continued if the authorization bit is on as at 65, whereas the process is terminated at 66 or a record (the user, object; etc.) is kept if the authorization bit is off as at 67. Thus, the present invention can prevent a paper document from being wrongfully duplicated or spilled by a copier or a fax. In general, an original paper document is managed relatively in a strict manner so that there is a high possibility, if the original is taken out, of discovering the fact of being wrongfully taken out when using (reading) the document next time, whereas tracing and managing a duplicated document is difficult. For the party taking it out, the psychological barrier is low in the sense that "the document was not stolen." In fact, a copier or a fax is used in many cases of wrongful information spilling. The frame provided by the present invention can check validity of the action when a duplicate is made so that it is highly effective in prevention of wrongful of paper documents.

Figure 7:
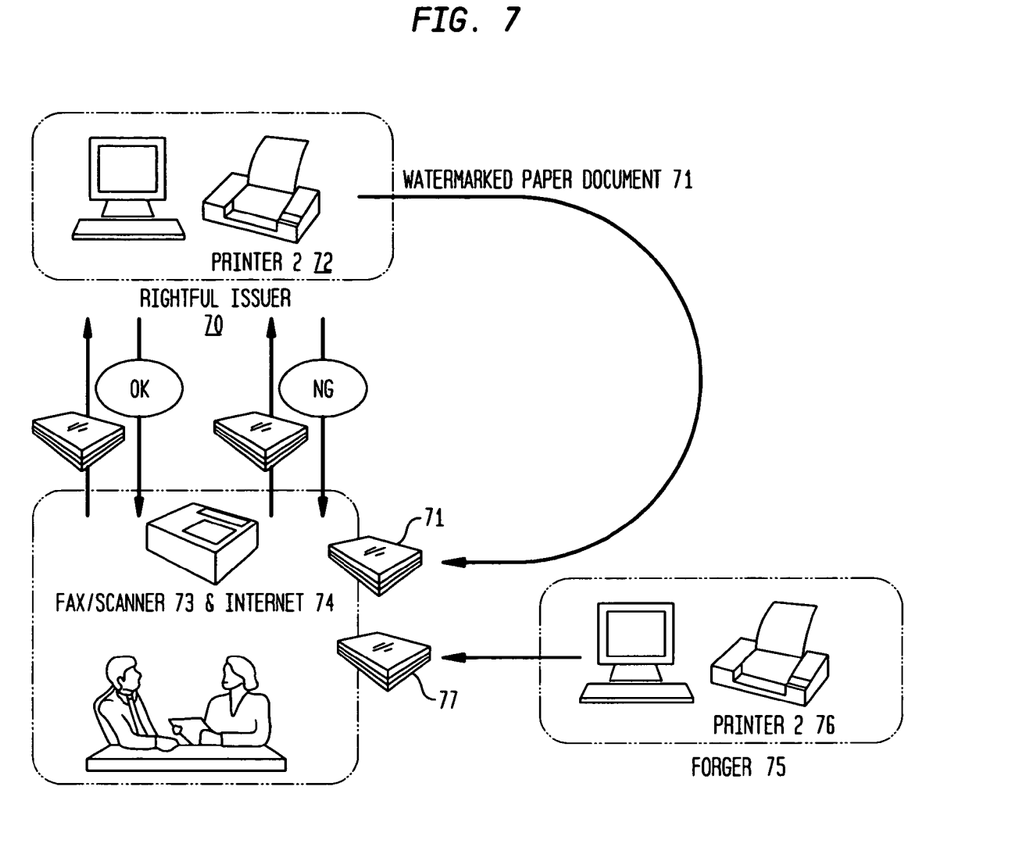
FIG. 7 is a diagram showing prevention of forgery by watermarking.

FIG. 7 shows a frame for preventing forgery of a document by using the present invention. An issuer 70 of an authentic document 71 uses a printer 72 with a watermark embedding function to print and circulate a document. Subject documents for a watermark embedding can be economic information that may influence action of others, certificates, tickets and so on. Contents of a watermark, how to split into and group subblocks on embedding and setting of the features are to be kept only by the issuer. If it becomes necessary to verify authenticity of a document, a document image can be sent to the issuer via fax 73 or the Internet 74, requesting determination as to whether or not a watermark can be properly detected. Even if a forger 75 knows the algorithm of a watermark embedding or has a printer 76 with a watermark embedding function, a forger cannot embed into a document 77 or detect the same watermark as far as how to split into and group subblocks and setting of the features are kept secret only to the issuer.

While the present invention is not suitable for embedding into a document image a large amount of information as required in secret communication, it is capable of stably detecting additional watermarking information even by scanning it after outputting it on paper. Accordingly, it can be used as a means of identifying contents or preventing forgery after outputting on paper.

While the invention has been particularly shown and described with respect to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:
1. An embedding method for embedding additional watermarking information into data representing text information as a black and white binary document image, comprising the steps of:
  detecting a text image area;
  splitting the detected text image area into two or more subblocks;

dividing the two or more subblocks into two or more groups;

extracting features for each of the two or more groups;

modifying the extracted features based on the additional watermarking information by increasing the extracted features of one group and decreasing the extracted features of another group; and, embedding the modified features into each of the two or more groups as the additional watermarking information, wherein the embedded additional watermark information is provided into said data representing text information in a manner that is not visually recognizable by human perception.

2. The method according to claim 1, wherein the step of dividing divides the two or more subblocks into two or more groups wherein the total sum of area of the subblocks in each group is substantially equal.

3. The method according to claim 1, wherein the step of splitting splits the detected text image area into two or more subblocks wherein boundary lines between the two or more subblocks pass through individual characters of the text image.

4. The method according to claim 1, wherein the step of modifying the extracted features comprises increasing or decreasing the extracted features in one or more steps.

5. The method according to claim 1, including the steps of detecting the embedded additional watermarking information by integrating the embedded features-detected for each of the two or more groups.

6. The method according to claim 5, including the step of detecting 1 or more bits of embedded additional watermarking information.

7. The method according to claim 1, including dividing the detected text image area into two subblocks vertically and two or more subblocks horizontally;

dividing the subblocks into different physically located upper groups and physically located lower groups.

8. The method according to claim 1, including embedding 1 or more bits of additional watermarking information.

9. The method according to claim 1, including:

integrating the features detected from subblocks in each of the two or more groups to obtain an integrated value for each group; and comparing the integrated values for the respective groups.

10. The method according to claim 1, wherein the extracted features comprise one or more features of black pixels, a transitive number of black and white pixels, an occurrence frequency of a specific local pattern, and an average thickness of a line segment.

11. The method according to claim 1, wherein the text image area for embedding the additional watermarking information comprises a rectangle circumscribed around one or more text lines.

12. The method according to claim 1, wherein the modified extracted features used for embedding additional watermarking information into data representing text information are statistically constant as compared to a state of no embedded watermarking to increase likelihood of detecting the watermarking information.

* * * * *